(12) United States Patent  
Shinohara et al.

(10) Patent No.: US 10,459,283 B2  
(45) Date of Patent: Oct. 29, 2019

(54) DISPLAY DEVICE

(71) Applicant: OMRON Corporation, Kyoto-shi, Kyoto (JP)

(72) Inventors: Masayuki Shinohara, Nagaokakyo (JP); Norihisa Kanzaki, Otsu (JP); Takuma Iwase, Ritto (JP); Yoshihiko Takagi, Kyoto (JP); Takaaki Suzumura, Ritto (JP); Takahiro Morichi, Otsu (JP); Norikazu Kitamura, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/899,696

(22) Filed: Feb. 20, 2018

(65) Prior Publication Data

US 2018/0173052 A1    Jun. 21, 2018

Related U.S. Application Data

(63) Continuation of application No. PCT/JP2016/081488, filed on Oct. 24, 2016.

(30) Foreign Application Priority Data

Nov. 27, 2015    (JP) .................................. 2015-231538

(51) Int. Cl.
*G02F 1/1335* (2006.01)
*F21V 8/00* (2006.01)

(52) U.S. Cl.
CPC ..... *G02F 1/133528* (2013.01); *G02B 6/0051* (2013.01); *G02B 6/0053* (2013.01);
(Continued)

(58) Field of Classification Search
CPC ................................................ G02F 1/133528
See application file for complete search history.

(56) References Cited

U.S. PATENT DOCUMENTS

2011/0261291 A1* 10/2011 Park ..................... G02B 6/0056  
                                                                      349/65  
2013/0107160 A1*  5/2013 Kim .......................... G09F 9/35  
                                                                      349/58  
(Continued)

FOREIGN PATENT DOCUMENTS

JP    S58-125897 U    8/1983  
JP    2013-198563 A   10/2013  
(Continued)

OTHER PUBLICATIONS

English translation of the International Search Report of PCT/JP2016/081488 dated Jan. 17, 2017.
(Continued)

*Primary Examiner* — Edmond C Lau  
(74) *Attorney, Agent, or Firm* — Metrolex IP Law Group, PLLC

(57) ABSTRACT

A display device includes a transparent liquid crystal panel configured to allow an object arranged at the rear surface to be viewed from the front surface; a first polarizer arranged on at least one of the front surface and the rear surface of the transparent liquid crystal panel; a light source; a light guide element arranged at the other of the front surface and the rear surface of the transparent liquid crystal panel; a second polarizer arranged between the light guide element and the transparent liquid crystal panel, or between the light guide element and the light source and arranged to not block at least a portion of light transmitted through the light guide element via the object; and a controller.

15 Claims, 19 Drawing Sheets

(52) U.S. Cl.
CPC .. *G02F 1/133553* (2013.01); *G02F 1/133602* (2013.01); *G02F 1/133615* (2013.01)

(56) References Cited

U.S. PATENT DOCUMENTS

2016/0187724 A1    6/2016   Masuda et al.
2017/0169749 A1    6/2017   Masuda

FOREIGN PATENT DOCUMENTS

| WO | 2015053023 A1 | 4/2015 |
| WO | 2015174276 A1 | 11/2015 |

OTHER PUBLICATIONS

English translation of the Written Opinion of PCT/JP2016/081488 dated Jan. 17, 2017.

\* cited by examiner

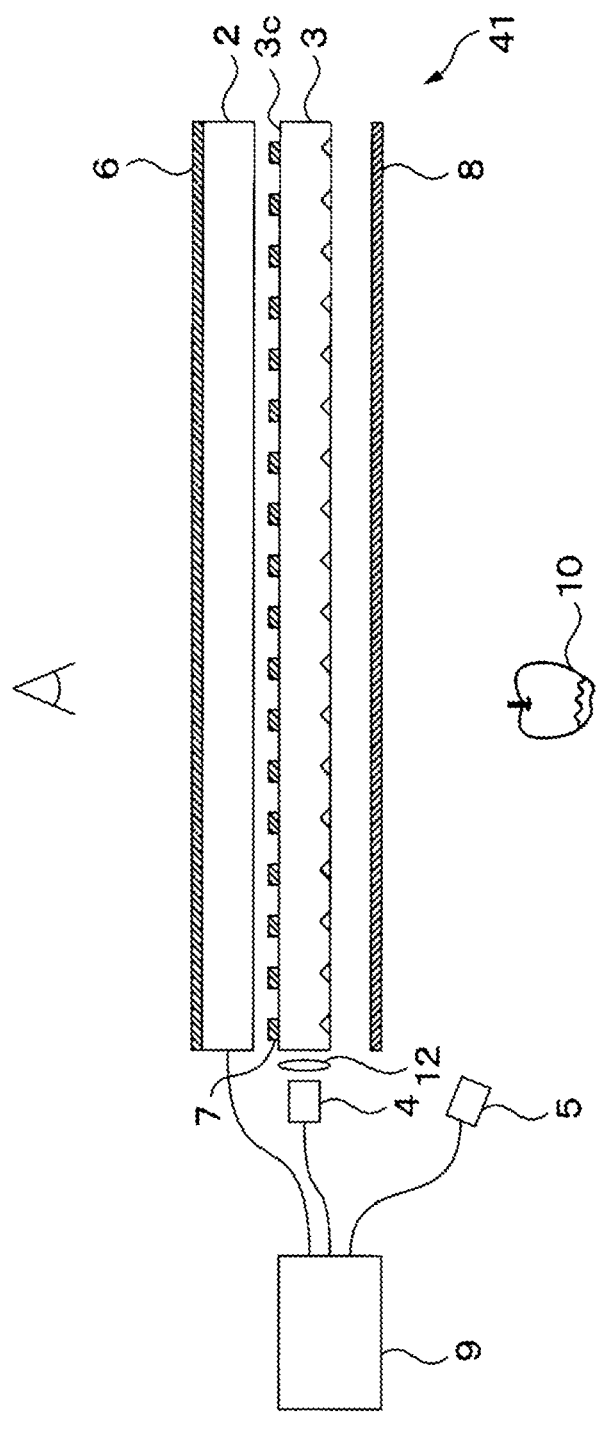

DISPLAY DEVICE

CROSS REFERENCE TO RELATED APPLICATIONS

This application is a continuation application of International Application No. PCT/JP2016/081488, filed on Oct. 24, 2016, which claims priority based on the Article 8 of Patent Cooperation Treaty from prior Japanese Patent Application No. 2015-231538, filed on Nov. 27, 2015, the entire contents of which are incorporated herein by reference.

FIELD

The disclosure relates to a display device capable of superimposing images on a display body.

BACKGROUND

As recently proposed (e.g., Japanese Patent Publication No. 2013-198563), a display device may use a transparent liquid crystal panel that permits viewing of a display body situated at the rear surface thereof.

For instance, the exhibition apparatus disclosed in JP 2013-198563A is equipped with a transparent liquid crystal panel on toward the observer and a dimmer panel near the rear surface. The dimmer panel allows transmission or non-transmission on a cell-by cell basis in any given region thereby providing a variety of ways to show the object for exhibition and image information on the transparent liquid crystal panel simultaneously.

Technical Problem

Despite this, the light from the light source used to illuminate the exhibition object in the exhibition apparatus disclosed in JP 2013-198563A also illuminates the image information on the transparent liquid crystal panel when the desire is to show the exhibition object and the image information on the transparent liquid crystal panel simultaneously. Therefore, the light used for creating the image information is not as bright and thus the exhibition apparatus cannot show the exhibition objects and the image information on the transparent liquid crystal panel clearly at the same time.

One or more embodiments provide a display device capable of showing both a display body located at the rear surface of a transparent liquid crystal panel and the image shown on the transparent liquid crystal panel clearly at the same time.

SUMMARY

One or more embodiments provide a display device. A display device includes a transparent liquid crystal panel configured to allow an object arranged at the rear surface to be viewed from the front surface; a first polarizer arranged on at least one of the front surface and the rear surface of the transparent liquid crystal panel; a first light source; a light guide element arranged at the other of the front surface and the rear surface of the transparent liquid crystal panel, and configured to direct light from the first light source toward the transparent liquid crystal panel; a second polarizer arranged between the light guide element and the transparent liquid crystal panel, or between the light guide element and the first light source and arranged to not block at least a portion of light transmitted through the light guide element via the object; and a controller configured to control the transparent liquid crystal panel so that at least a portion of light emitted from the first light source and entering the transparent liquid crystal panel via the second polarizer is transmitted through the first polarizer in a region of the transparent liquid crystal panel showing an image.

It may be preferable that the light guide element in the display device element includes a plurality of prisms arranged between the rear surface of the transparent liquid crystal panel and the object, and configured to reflect light from the first light source toward the transparent liquid crystal panel; and the second polarizer arranged between the light guide element and the transparent liquid crystal panel to not block at least a portion of light passing through the light guide element via the object and configured to transmit light emitted from the first light source and reflected by any of the plurality of prisms.

In this case, it may be preferable that each of the prisms includes a reflection surface that is concave relative to the first light source.

Alternatively, the first light source may include a plurality of light emitting elements, and the plurality of prisms reflects light emitted from the plurality of light emitting elements respectively toward a different location on the second polarizer.

The display device may further include: a diffusion material; the diffusion material arranged between the second polarizer and the light guide element to not block at least a portion of light passing through the light guide element via the object and configured to diffuse light emitted from the first light source and reflected by any of the plurality of prisms.

In this case, a first group of pixels in the transparent liquid crystal panel transmits a first light that passed through the second polarizer oriented in a first direction, the first light emitted from the first light source and diffused by the diffusion material after passing through the light guide element; a second group of pixels in the transparent liquid crystal panel transmits a second light that passed through the second polarizer oriented in a second direction, the second light emitted from the first light source, diffused by the diffusion material after passing through the light guide element; and the controller applies a voltage to the first group of pixels thereby rotating the polarization plane of the first light so that the transparent liquid crystal panel presents an image of a predetermined object from the first direction, and on the other hand applies a voltage to the second group of pixels thereby rotating the polarization plane of the second light so that the transparent liquid crystal panel presents an image of the predetermined object from the second direction.

Alternatively, the first light source in the display device may include a plurality of light emitting elements, and the light guide element includes a plurality of prisms configured to reflect light emitted from the first light source toward the transparent liquid crystal panel; and a first group of pixels in the transparent liquid crystal panel transmits a first light, the first light emitted from the plurality of light emitting elements, reflected by the plurality of prisms toward a first direction, and transmitted by the second polarizer; a second group of pixels in the transparent liquid crystal panel transmits a second light, the second light emitted from the light emitting elements, reflected by the plurality of prisms toward a second direction, and transmitted by the second polarizer; and the controller applies a voltage to the first group of pixels thereby rotating the polarization plane of the first light so that the transparent liquid crystal panel presents an image of a predetermined object from the first direction, and on the other hand applies a voltage to the second group pixels thereby rotating the polarization plane of the second light so that the transparent liquid crystal panel presents an image of the predetermined object from the second direction.

The second polarizer in the display device may be placed between the light guide element and the first light source.

The display device may further include a third polarizer situated between the object and the light guide element. In this case, the direction of the transmission axis of the second polarizer and the direction of the transmission axis of the third polarizer are provided such that the polarization plane of light emitted from the first light source, transmitted through the second polarizer, and entering the transparent liquid crystal panel and the polarization plane of light transmitted through the third polarizer and the light guide element via the object to enter the transparent liquid crystal panel are mutually orthogonal.

Effects

A display device according to one or more embodiments is capable of showing both a display body located at the rear surface of a transparent liquid crystal panel and the image shown on the transparent liquid crystal panel clearly at the same time.

BRIEF DESCRIPTION OF THE DRAWINGS

FIG. 4 is a schematic side view illustrating an example of modifying a display device;

DETAILED DESCRIPTION

A display device according to one or more embodiments is described below with reference to the drawings. This display panel employs a transparent liquid crystal panel that allows a display body positioned at the rear surface thereof to be seen therethrough. A polarizer is arranged in the display device to not block light passing through the light guide plate via the display body. Therefore, the polarization direction of light from the backlight used to display an image on the transparent liquid crystal panel and the polarization direction of light from a light source used to illuminate the display body may be mutually orthogonal; hereby, whether light is transmitted from the backlight or from the light source may be controlled on a per pixel basis on the transparent liquid crystal panel. This makes it possible to present the image and the display body clearly at the same time.

In the description that follows, the side of the light guide panel facing the observer is assumed to be the front surface, and the opposite surface taken as the rear surface.

Figure 1:
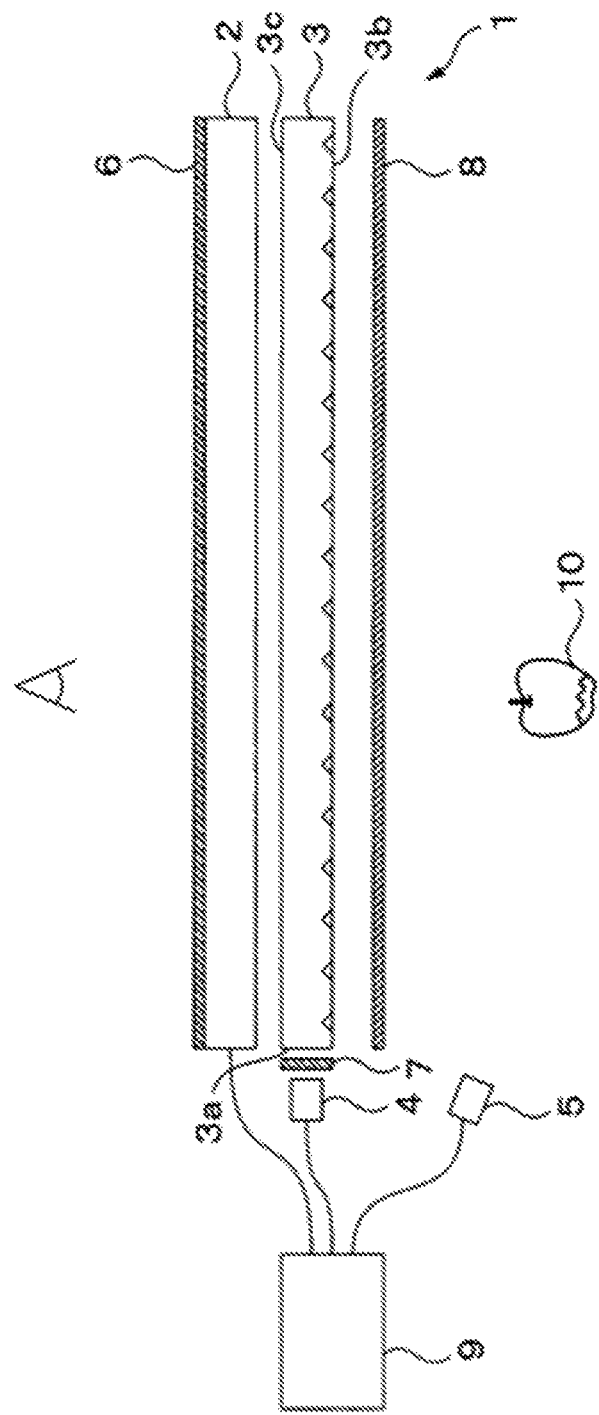
FIG. 1 is a schematic view illustrating a configuration of a display device according to one or more embodiments.

FIG. 1 is a schematic view illustrating a configuration of a display device according to one or more embodiments. The display device 1 includes a transparent liquid crystal panel 2, a light guide plate 3, a first light source 4, a second light source 5, a first polarizer 6, a second polarizer 7, a third polarizer 8, and a controller 9.

The first polarizer 6 is arranged near the front surface of the transparent liquid crystal panel 2 while the light guide plate 3 is arranged near the rear surface of the transparent liquid crystal panel 2. The first light source 4 is arranged facing the incidence surface 3a of the light guide plate 3. A display body 10 to be rendered visible for a viewer is arranged at the rear surface of the light guide plate 3. The second light source is configured to illuminate the display body 10 such that the display body 10 reflects and scatters light and said light passes through the light guide plate 3 of the transparent liquid crystal panel 2. The second polarizer 7 is disposed between the first light source 4 and the light guide plate 3, whereas the third polarizer 8 is arranged between the display body 10 and the light guide plate 3.

The transparent liquid crystal panel 2 includes a display region capable of showing an image. More specifically, the transparent liquid crystal panel 2 controls the polarization plane of light emitted from the first light source 4 and entering therein via the second polarizer 7 and the light guide plate 3 on a per pixel basis in accordance with an image signal from the controller 9, whereby the transparent liquid crystal panel 2 presents an image according to the image signal in the display region. For example, the transparent liquid crystal panel 2 may include a liquid crystal layer with liquid crystal molecules encapsulated therein; two transparent electrodes produced from ITO or the like, and arranged facing each other sandwiching the liquid crystal layer therebetween; and two transparent substrates produced from glass or a transparent resin, and arranged facing each other sandwiching the liquid crystal layer and the transparent electrodes therebetween. An alignment film may also be formed between the liquid crystal layer and the transparent electrodes to regulate the orientation of the liquid crystal molecules. One of the transparent electrodes may also be configured as a matrix, thus making it feasible to adjust the voltage applied in accordance with the image signal on a per pixel basis. A color filter with a predetermined per pixel pattern may also be placed between one of the transparent electrodes and the transparent substrate; this allows the transparent liquid crystal panel 2 to present color images.

Two alignment films orient the liquid crystal molecules within the liquid crystal layer in a predetermined direction. The liquid crystal molecules in the liquid crystal layer may be arranged in a twisted nematic field; in this case the two alignment films are arranged with mutually orthogonal orientation directions.

The light guide plate 3 is one example of a light guide element. The light guide plate 3 is sheet-like with an area larger than the display region of the transparent liquid crystal panel 2; the light guide plate 3 is placed facing the rear surface of the transparent liquid crystal panel 2.

One of the side surfaces of the light guide plate 3 serves as the incidence surface 3a with the first light source 4 opposite thereto. Light from the first light source 4 enters the light guide plate 3 from the incidence surface 3a after passing through the second polarizer 7. The light propagating inside the light guide plate 3 is totally reflected by the diffusion surface 3b which is on the rear surface of the light guide plate; hereafter, the light exits from the emission surface 3c facing the rear surface of the transparent liquid crystal panel 2 and enters the transparent liquid crystal panel 2. The incidence surface 3a may be formed as a convex surface facing the first light source 4 so that the incidence surface 3a functions as a collimating lens that increases the directivity of the light from the first light source 4.

The second light source 5 may also be turned on; in this case, light from the second light source 5 is reflected and scattered by the display body 10; this light enters the light guide plate 3 from the diffusion surface 3b thereof after passing through the third polarizer 8, is transmitted through the light guide plate 3 unaltered, and exits from the emission surface 3c toward the transparent liquid crystal panel 2.

In one or more embodiments the light guide plate 3 may be produced by pasting a diffusion sheet, which includes the diffusion surface 3b, onto the rear surface of a flat glass plate. The diffusion sheet may be produced from an infrared curable resin that is transparent to visible light. As is later described, a pattern is transferred to the light guide plate 3; this pattern includes a plurality of prisms that function to reflect the light propagating in the light guide plate 3. Alternatively, the light guide plate 3 may be molded from a resin that is transparent to visible light and made of poly methyl methacrylate (PMMA), a polycarbonate, or a cycloolefin polymer. In this case, a plurality of prisms are heat transferred to the resin thereby creating a pattern on the diffusion surface 3b for reflecting light through the light guide plate 3. The resin is slowly cooled to ensure no internal stress is generated and the light guide plate 3 is thus formed.

A light guide plate 3 produced in this manner is prevented from exhibiting birefringent properties. Thus, the polarization plane of light entering the light guide plate 3 will not rotate or change from linearly polarized to elliptically polarized light while propagating or passing through the light guide plate 3.

Figure 2A:
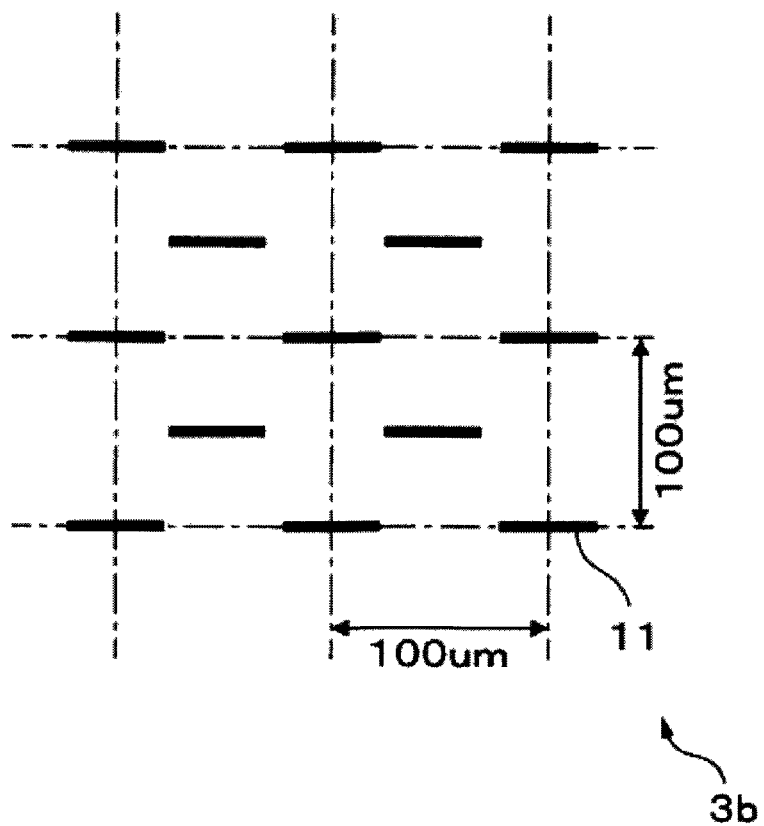
FIG. 2A is a partially exploded view illustrating a decision surface view from the front.

FIG. 2A is a partially exploded view of a decision surface view from the front. The diffusion surface 3b reflects light entering from the incidence surface 3a and causes the light to exit uniformly from the emission surface 3c. Moreover, the plurality of prisms 11 on the diffusion surface 3b are staggered at a predetermined pitch so that this light enters almost perpendicularly to the transparent liquid crystal panel 2. The predetermined pitch of the plurality of prisms 11 may allow the prisms to be arranged in a grid. For instance, the predetermined pitch may be 100 μm.

Figure 2B:
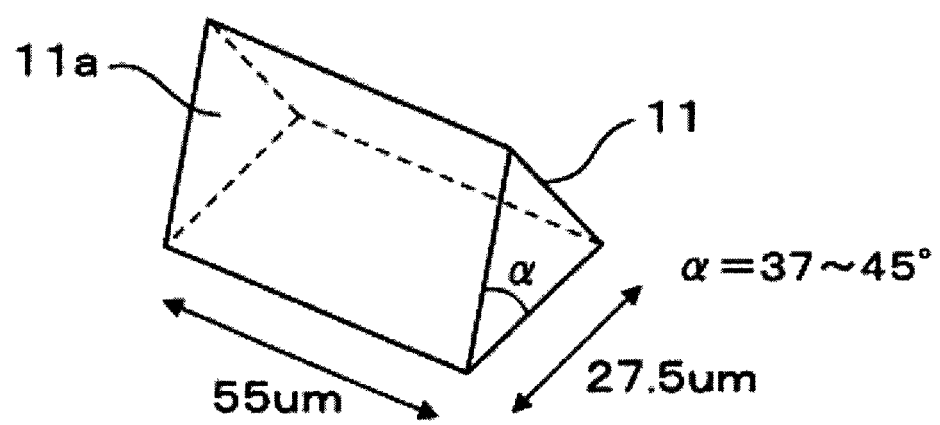
FIG. 2B is a schematic perspective view illustrating a prism on the diffusion surface.

FIG. 2B is a schematic perspective view of a prism 11; each of the prisms 11 may be formed in the diffusion surface 3b as a roughly triangular groove of a predetermined length. Each of the prisms 11 forms a predetermined angle α with the diffusion surface 3b and includes a reflection surface 11a that is oriented facing the first light source 4. This predetermined angle α is established so that light from the first light source 4 entering the light guide plate 3 is totally internally reflected and travels toward the emission surface 3c; for instance, this angle may be 37° to 45° relative to the diffusion surface 3b. Additionally, the predetermined length may be roughly 55 μm, and the width of the groove may be roughly 27.5 μm.

The distribution density is the percentage area of the diffusion surface 3b with regions whereon the prisms 11 are formed. This distribution density is preferably no more than an upper limit where an observer can perceive the display body 10 behind the light guide plate 3 as if via a transparent material or via an unobstructed space. Therefore, for instance, the prisms 11 are preferably distributed at a density of no more than 30.0%.

Alternatively, haze represents the proportion of diffusion light relative to all the light transmitted through the light guide plate 3. The haze is preferable no more than an upper limit where an observer may perceive the display body 10 behind the light guide plate 3 as if through a transparent material or through an unobstructed space. Therefore, for instance, the prisms 11 are preferably arranged so that the haze is no more than 28%.

The first light source 4 may include a light emitting element such as a white light emitting diode or a fluorescent light, and may be placed so that the light emission plane faces the incidence surface 3a of the light guide plate 3. For example, the first light source 4 may be placed so that direction of maximum light emission intensity is orthogonal to the incidence surface 3a. The first light source 4 may include a plurality of light emitting elements. In this case, the plurality of light emitting elements may be aligned lengthwise along the incident surface 3a in a single line spanning roughly the width of the display region of the transparent liquid crystal panel 2. The controller 9 sends a control signal according to which the first light source 4 turns on or off. For instance, the first light source 4 may be turned on when the transparent liquid crystal panel 2 shows an image. In contrast, the first light source 4 may be turned off when the transparent liquid crystal panel 2 does not show an image. Additionally, for a first light source 4 including a plurality of light emitting elements, only the light emitting elements needed for illumination may be turned on when a portion of the transparent liquid crystal panel 2 is made to show an image. Alternatively, the plurality of light emitting elements may be configured to emit mutually different colors, and the light emitting element that is turned on is controlled in accordance with the colors in the image to be shown on the transparent liquid crystal panel 2.

The second light source 5 may include a light emitting element such as a white light emitting diode or a fluorescent light, and may be arranged to illuminate a display body 10 situated near the rear surface the light guide plate 3. If there is a desire to illuminate the display body 10 with a specific color, the second light source 5 may be a light emitting diode capable of emitting said specific color. Note that the second light source 5 is preferably arranged closer to the light guide plate 3 than the display body 10 if the display body 10 is nontransparent, so that reflections or scattering of light from the display body 10 can enter the light guide plate 3. The second light source 5 may include a plurality of light emitting elements. For example, the second light source 5 may include a plurality of light emitting elements that surround the display body 10. The second light source 5 may itself be a display body 10 that can be observed via the display region of the transparent liquid crystal panel 2. Moreover, the second light source 5 is preferably arranged so that light from the second light source 5 is not directly incident on the incidence surface 3a of the light guide plate 3. Similar to the first light source 4, the controller 9 sends a control signal according to which the second light source 5 turns on or off. For example, the second light source 5 may be turned off when the desire is to prevent the observer from seeing the display body 10. Whereas the second light source 5 may be turned on when the desire is for the observer to see the display body 10. Furthermore, in one example of modifying one or more embodiments the second light source 5 may be omitted. In this case, the display body 10 may be illuminated by ambient light external to the display device 1 such as sunlight.

The first through third polarizers 6-8 are devices that allow polarized light having a polarization plane of a specific orientation to pass therethrough. The transmittance of light transmitted by the first polarizer 6 increases as the angle between the polarization plane of the light and the transmission axis of the first polarizer 6 decreases. The first polarizer 6 in one or more embodiments is situated on the front surface of the transparent liquid crystal panel 2 covering the display region thereof. Accordingly, the transparent liquid crystal panel 2 can adjust the transmittance of light from the first light source 4 and light from a display body 10 illuminated by the second light source 5 on a per pixel basis via the first polarizer 6 in accordance with an image signal from the controller 9. In other words, light emitted from the first light source 4 enters the transparent liquid crystal panel 2 via second polarizer 7 and the light guide plate 3. The transparent liquid crystal panel 2 applies a voltage to the liquid crystal layer as the light passes therethrough; the polarization plane of the light rotates in accordance with the voltage applied to the liquid crystal layer and thus changes the intensity of the light transmitted by the first polarizer 6. Similarly, the display body 10 reflects and scatters the light emitted from the second light source 5, and the light passes through the third polarizer 8 and the light guide plate to enter the transparent liquid crystal panel 2; as the polarization plane of this light passes through the liquid crystal layer of the transparent liquid crystal panel 2, the same rotates in accordance with the voltage applied to the liquid crystal layer whereby the light intensity of the light transmitted through the first polarizer 6 changes.

The second polarizer 7 is situated substantially parallel to the incidence surface 3a of the light guide plate 3 between the first light source 4 and the incidence surface 3a. The second polarizer 7 is also large enough to ensure that light from the first light source 4 passes through the second polarizer 7 to reach the incident surface 3a. Thus, light emitted from the first light source 4 and passing through the second polarizer 7 enters the light guide plate 3 as linearly polarized light. Placing the second polarizer 7 between the first light source 4 and the incidence surface 3a of the light guide plate 3 allows for a compact second polarizer 7.

The third polarizer 8 is a sheet-like material that is roughly the same size as the display region of the transparent liquid crystal panel 2; the third polarizer 8 is situated between the display body 10 and the rear surface of the light guide plate 3 (i.e., the diffusion surface 3b) roughly parallel to the rear surface. Thus, light emitted from the third polarizer 8, reflected and scattered by the display body 10 and passing through the third polarizer 8 enters the light guide plate 3 as linearly polarized light.

However, the transmission axis of the second polarizer 7 and the transmission axis of the third polarizer 8 are such that the polarization planes of the linearly polarized light entering the transparent liquid crystal panel 2 are mutually orthogonal. More specifically, the transmission axes are such that the polarization plane of light emitted from the first light source 4 and passing through the second polarizer 7 and the light guide 3 to enter the transparent liquid crystal panel 2 as linearly polarized light is mutually orthogonal to the polarization plate of light emitted from the second light source 5, reflected and scattered by the display body 10 and passing through the third polarizer 8 and the light guide plate 3 to enter the transparent liquid crystal panel 2 as linearly polarized light. For instance, the second polarizer 7 may be arranged such that the transmission axis thereof is substantially parallel to the diffusion surface 3b and the emission surface 3c (i.e., in a direction normal to the drawing sheet); whereas, the third polarizer 8 may be configured such of the transmission axis thereof is orthogonal to the incident surface 3a (i.e., in a direction parallel to the drawing sheet). Hereby, the transparent liquid crystal panel 2 can establish different transmittances for light from the first light source 4 and light from the second light source 5.

The controller 9 may include a processor, a memory circuit, a drive circuit for the transparent liquid crystal panel 2, and drive circuits for each of the light sources. The controller 9 controls the transparent liquid crystal panel 2, the first light source 4, and the second light source 5 in accordance with control signals from a host control device. When the desire is to hide the display object display body 10 from an observer located in front of the transparent liquid crystal panel 2, the controller may turn off the second light source 5. Whereas, the controller 9 may turn on the second light source 5 so that the observer may see the display body 10. The controller 9 may also turn on the first light source 4 so that the transparent liquid crystal panel 2 shows an image. Whereas, the controller 9 may turn off the first light source 4 so that transparent liquid crystal panel 2 shows no image.

In order to show the observer both the image presented by the transparent liquid crystal panel 2 and the display body 10, the controller may turn on both the first light source 4 and the second light source 5 and adjust the voltage applied to the transparent liquid crystal panel 2 on a per pixel basis. The controller 9 may also adjust the voltage applied to the pixels in the region of the transparent liquid crystal panel 2 presenting an image so that at least a portion of the light emitted from the first light source 4 and entering the transparent liquid crystal panel 2 via the second polarizer 7 and the light guide plate 3 can pass through the first polarizer 6 on passing through the transparent liquid crystal panel 2. Hereby, an observer may see an image presented on the transparent liquid crystal panel 2. As above described, the polarization plane of light from the first light source 4 and the polarization plane of light from the second light source 5 are mutually orthogonal when entering the transparent liquid crystal panel 2 due to the second polarizer 7 and the third polarizer 8. Accordingly, the higher the transmittance of light from the first light source 4 via the first polarizer 6 in the region presenting an image, the lower the transmittance of light from the second light source 5 via the first polarizer 6.

Whereas, the controller 9 causes the polarization plane of light entering the transparent liquid crystal panel 2 from the display body 10 via the second polarizer and the light guide plate 3 to pass through the transparent liquid crystal panel 2 in pixels outside a region presenting an image. Hereby, the controller adjusts the voltage applied to the pixels outside the region presenting the image so that the aforementioned polarization plane is parallel to the transmission axis of the first polarizer 6; in other words, so that the light passes through the first polarizer 6 on the transparent liquid crystal panel 2. Thus, light emitted from the first light source 4 and entering the transparent liquid crystal panel 2 via the second polarizer 7 and the light guide plate 3 does not pass through the first polarizer 6 because the polarization plane of the light is orthogonal to the transmission axis of the first polarizer 6 on the transparent liquid crystal panel 2. Consequently, light from the first light source 4 does not affect the appearance of the display body 10 in the pixels outside the region presenting the image. Therefore, the display body 10 will not be obscured in regions outside regions presenting an image even if the first light source 4 is turned on.

Figure 3A:
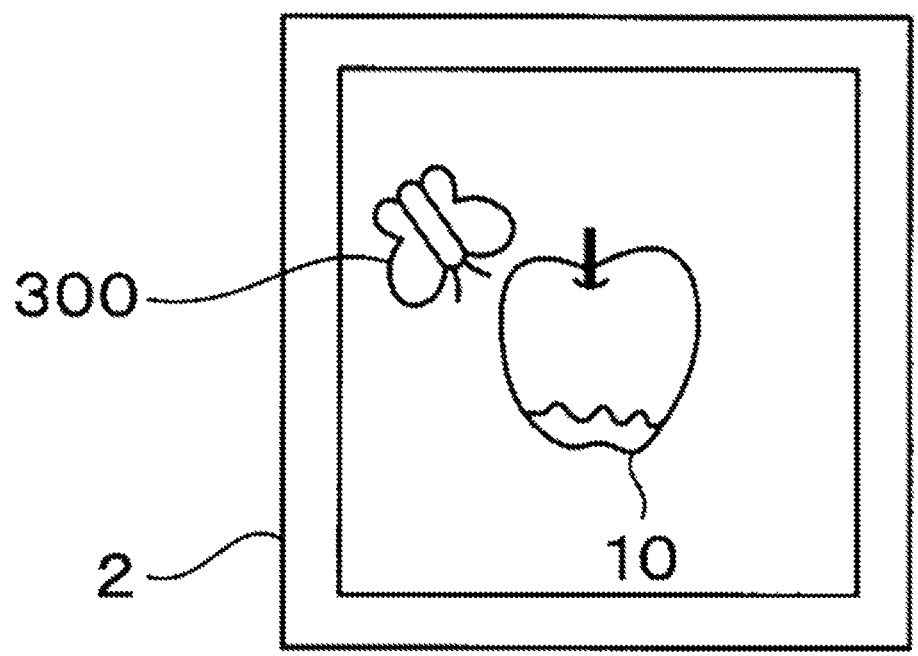
FIG. 3A is a front view illustrating a display device and illustrates when the display body and the image on the transparent liquid crystal panel are presented simultaneously.
Figure 3B:
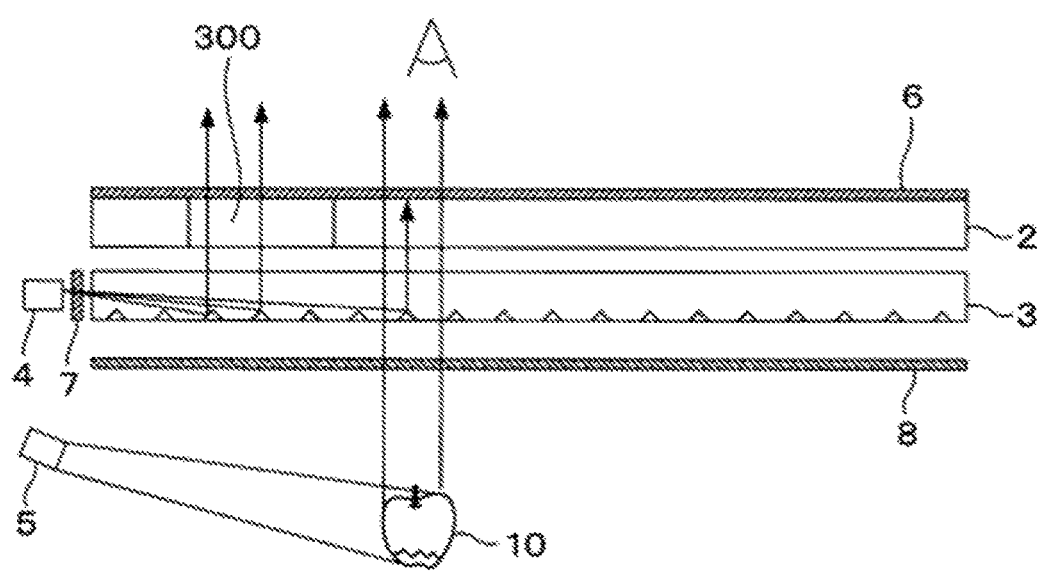
FIG. 3B is a diagram illustrating a state when the corresponding light is transmitted.

FIG. 3A is a front view of the display device 1 and illustrates when the display body 10 and the image on the transparent liquid crystal panel 2 are presented simultaneously; FIG. 3B illustrates a state when the corresponding light is transmitted. As illustrated in FIG. 3A and FIG. 3B, the voltage applied to the pixels in an image display region 300 on the transparent liquid crystal panel 2 is adjusted so that at least a portion of light from the first light source 4 passes through the first polarizer 6. Whereas, the voltage applied to the pixels outside the image display region 300 is adjusted so that the light emitted from the second light source 5, and reflected and scattered by the display body 10 passes through the first polarizer 6; said voltage is also adjusted so that the light emitted from the first light source 4 does not pass through the first polarizer 6. An observer is therefore able to clearly see the image presented on the transparent liquid crystal panel 2 and the display body 10 at the same time.

When the transparent liquid crystal panel 2 is capable of displaying color, the voltage of the pixels in the image display region on the transparent liquid crystal panel 2 may be adjusted so that in the image is presented in the image display region due to the light from the first light source 4 passing through the transparent liquid crystal panel 2. If the first light source 4 is turned off while the transparent liquid crystal panel 2 is presenting an image, the image may be presented with complementary colors relative to the color of the image itself by using the light from the second light source 5 in the image display region. Therefore, the controller 9 may simply adjust the voltage of the pixels in the image display region so that the natural colors of the image are rendered as complementary colors when also displaying the image on the transparent liquid crystal panel 2 while the first light source 4 is turned off.

As above described, the display device ensures that the polarization plane of light emitted from the first light source for illuminating an image for presentation on the transparent liquid crystal panel and the polarization plane of light from a display body arranged behind the transparent liquid crystal panel are orthogonal. Hereby, the display device allows mainly light for illuminating the image to pass through the transparent liquid crystal panel in the region displaying an image, while allowing mainly light from the display body to pass through the transparent liquid crystal panel in regions outside the region presenting the image. Therefore, the display device is capable of showing an image on the transparent liquid crystal panel and a display body arranged behind the transparent liquid crystal panel clearly and simultaneously to an observer positioned in front of the transparent liquid crystal panel.

One or more embodiments may be modified such that the prisms provided on the diffusion surface 3b of the light guide plate 3 reflect light emitted from the first light source 4 and entering the light guide plate 3 so that the light passes through a small specific region between the light guide plate 3 and the transparent liquid crystal panel 2. In this case, the second polarizer 7 which controls the polarization direction of light from the first light source 4, causes light from the first light source 4 to pass between the light guide plate 3 and the transparent liquid crystal panel 2 and is arranged to not block at least a portion of light emitted from the second light source 5 and reflected and scattered by the display body 10.

FIG. 4 is a schematic side view illustrating an example of modifying a display device 41. In this modification example, a plurality of second polarizers 7 are discretely placed between the emission surface 3c of the light guide plate 3 and the rear surface of the transparent liquid crystal panel 2. That is, a small area provided with a second polarizer 7, and another area provided with no second polarizer 7 are alternated between the emission surface 3c of the light guide plate 3 and the rear surface of the transparent liquid crystal panel 2. A second polarizer 7 and the third polarizer 8 are disposed so that the transmission axis for each second polarizer 7 and the transmission axis for the third polarizer 8 are mutually orthogonal. Light from the first light source 4 enters the light guide plate 3 via a collimating lens 12. The features of the modification example that are distinct from the above one or more embodiments are described below.

The total surface area of the small areas provided with a second polarizer 7 is preferably no more than half the surface area of the display region of the transparent liquid crystal panel 2. Thus, this prevents the second polarizer 7 from excessively blocking light emitted from the second light source 5, reflected and scattered by the display body 10 and then passing through the third polarizer 8 and the light guide plate 3, and thus prevents the display body 10 from appearing dim when viewed from the front.

Figure 5A:
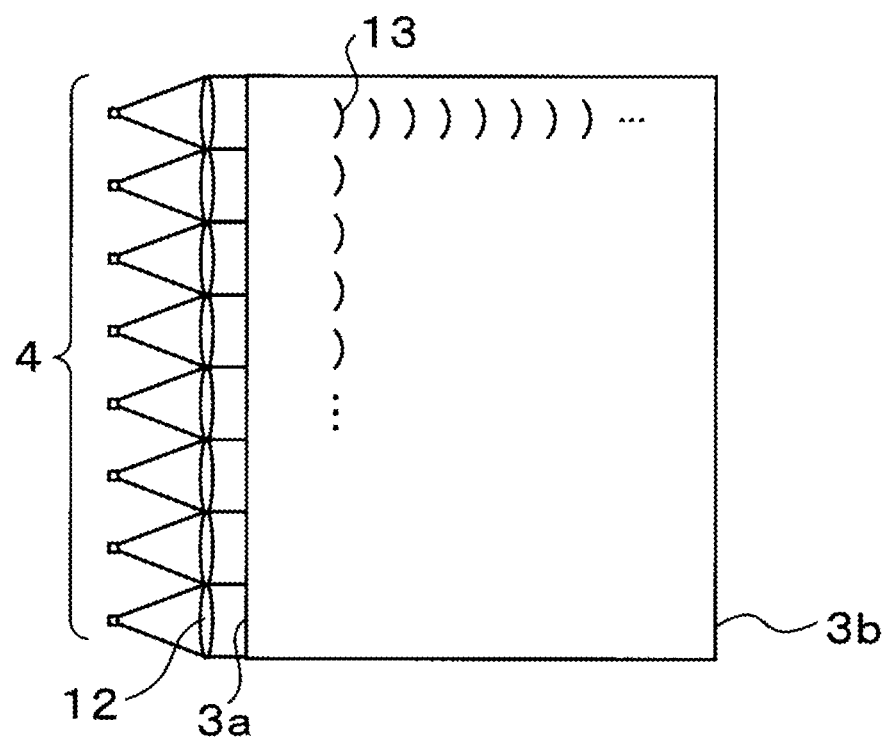
FIG. 5A is a schematic front view illustrating a diffusion surface on a light guide plate to illustrate a possible arrangement of prisms according to a modification example.
Figure 5B:
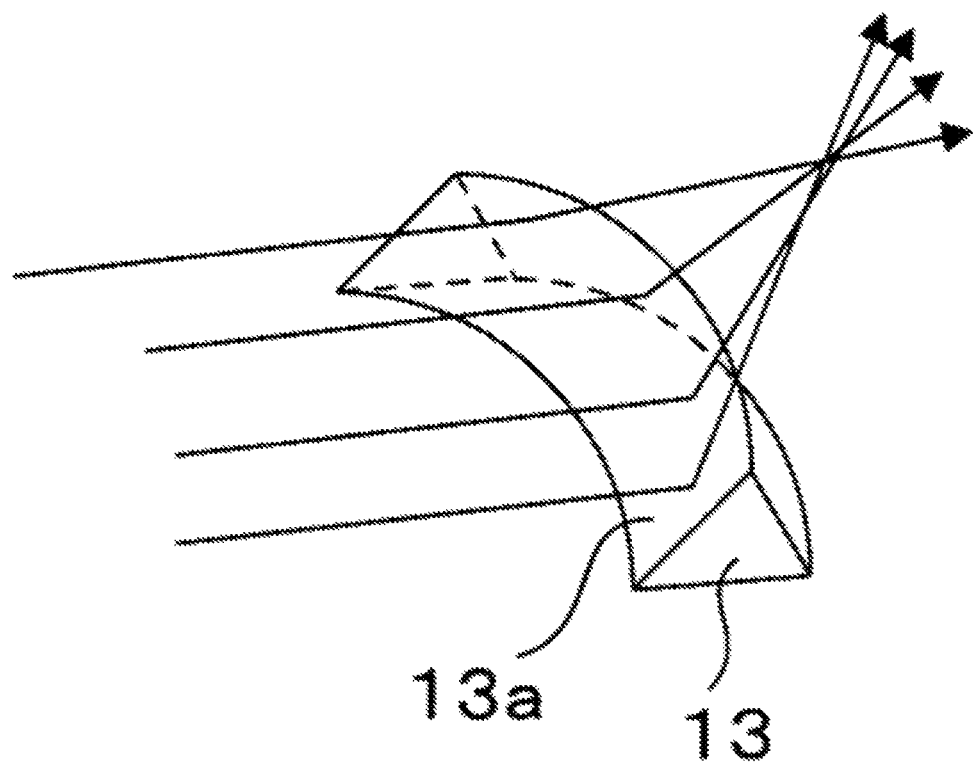
FIG. 5B is a schematic perspective view illustrating a prism.
Figure 5C:
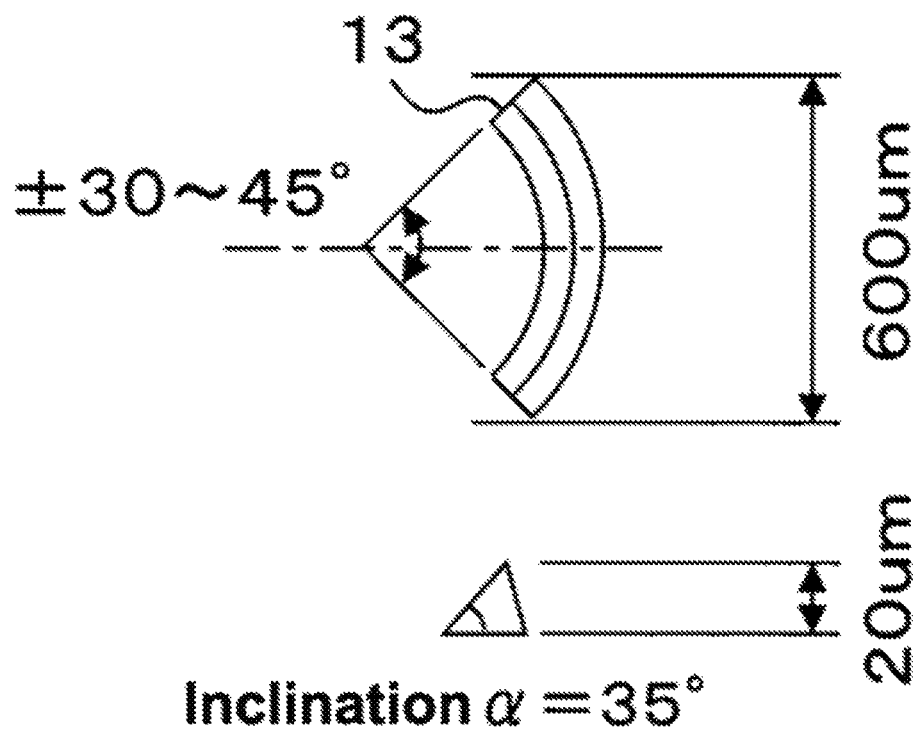
FIG. 5C is a schematic front view illustrating a prism.

FIG. 5A is a schematic front view of a diffusion surface 3b on the light guide plate 3 to illustrate a possible arrangement of prisms according to another modification example; FIG. 5B is a schematic perspective view of a prism; and FIG. 5C is a schematic front view of a prism.

In this example the first light source 4 includes a plurality of light emitting elements; light from each light emitting element enters the light guide plate 3 as substantially parallel light due to a collimating lens 12 provided between the incidence surface 3a and a light emitting element. Note that the collimating lenses 12 may be produced from injection molding a resin that is transparent to visible light. The collimating lenses 12 may be configured as aspherical lenses to correct any aberrations; more specifically, the sphericity of the collimating lenses 12 may decrease as the distance from the optical axis thereof increases.

The prisms 13 formed on the diffusion surface 3b are arced shaped with a concave reflection surface toward the first light source 4. Each of the prisms 13 may have a central angle of 60° to 90° on a surface parallel to the diffusion surface 3b, and arranged symmetrical about a direction light from the first light source 4 strikes the prism. The width of the prism along a direction orthogonal to the direction light from the first light source strikes the prism may be 600 μm and the height from diffusion surface 3b may be 20 μm. The inclination α of the reflection surface 13a may be 35°.

The prisms 13 thusly formed ensure that light emitted from the first light source 4 and entering the light guide plate 3 reflects from any of the prisms 13 whereby the prisms 13 focus light on substantially one point between the light guide plate 3 and the transparent liquid crystal panel 2. Therefore, the second polarizer 7 may be disposed so that each of the prisms 13 is coupled to that focal point.

This modification example also allows light from the first light source 4 and light emitted from the second light source 5 and reflected and scattered by the display body 10 to illuminate the transparent liquid crystal panel 2. Therefore, similarly to the above mentioned one or more embodiments, the controller 9 may adjust the voltage applied to the pixels in the image display region on the transparent liquid crystal panel 2 so that at least a portion of the light emitted from the first light source 4 and passing through the second polarizer 7 passes through the first polarizer 6; furthermore, the controller 9 may, on the other hand, adjust the voltage applied to each of the pixels outside the image display region on the transparent liquid crystal panel 2 so that the polarization plane of light emitted from the second light source 5 and passing through the third polarizer 8 is substantially parallel to the transmission axis of the first polarizer 6. Hereby, a display device modified according to this example can clearly and simultaneously show an image on the transparent liquid crystal panel and a display body. The modification example also facilitates production of the light guide plate 3 because light from the first light source 4 is allowed to pass through the light guide plate 3 before entering the second polarizer 7, thus alleviating the conditions pertaining to birefringence in the light guide plate 3.

The above mentioned modification example also allows light from a plurality of light emitting elements in the first light source 4 to enter the prisms 13. Here, the collimating lenses 12 may be omitted to allow the light entering the light guide plate 3 from the light emitting elements to spread. The triangular prisms 11 illustrated in FIG. 2B may be formed on the diffusion surface 3b instead of the prisms 13.

Figure 6:
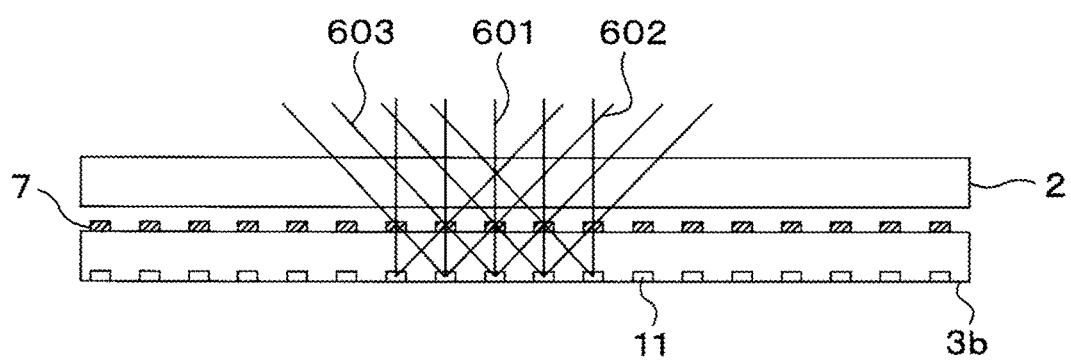
FIG. 6 is a schematic view illustrating the path of light from a first light source according to a modification example when viewed from near the incidence surface.

FIG. 6 is a schematic view illustrating the path of light from the first light source 4 according to a modification example when viewed from near the incidence surface 3a. In this modification example, light rays 601 from the light emitting element directly in front of a prism 11 is reflected by the prism 11 toward the normal direction of the diffusion surface 3b. In contrast, a light beam 602 from a light emitting element position to the left of a prism 11 is incident on the prism 11 at an incline from the left and thus the prism 11 reflects the light beam toward the right at a diagonal to the normal direction. In contrast, a light beam 603 from a light emitting element positioned to the right of a prism 11 is incident on the prism 11 at an incline from the right and thus the prism 11 reflects the light beam toward the left at a diagonal to the direction of the normal line. As a result, light from a plurality of prisms 11 thusly oriented in mutually different directions are incident on a single second polarizer 7. That is, this modification example widens the spread angle of the light passing through the second polarizers 7 and illuminating the transparent liquid crystal panel 2. This therefore broadens the angle from which an image presented on the transparent liquid crystal panel 2 may be seen.

In yet another modification example, a diffusion sheet may be disposed between a plurality of second polarizers 7 and the emission surface 3c of the light guide plate 3 respectively.

Figure 7:
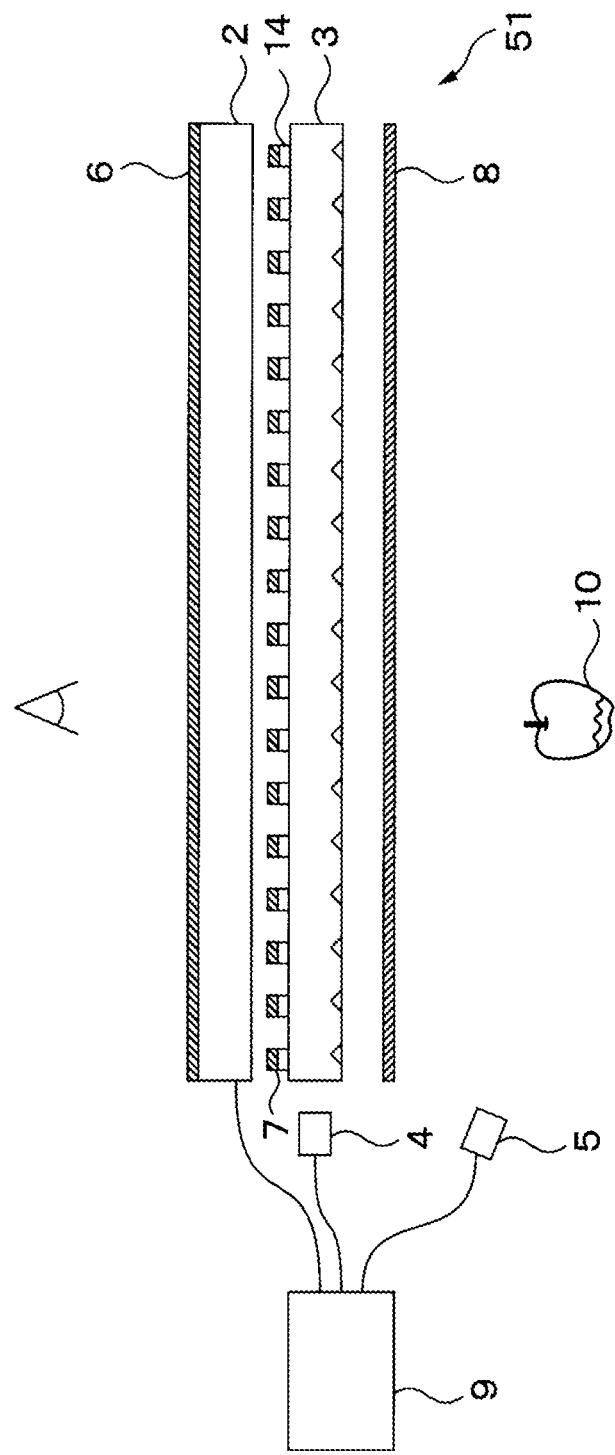
FIG. 7 is a schematic side view illustrating another example of modifying a display device.

FIG. 7 is a schematic side view illustrating an example of modifying a display device 51. In this modification example, in contrast to the display device 41 illustrated in FIG. 4, a diffusion sheet 14 is disposed between a plurality of second polarizers 7 and the emission surface 3c of the light guide plate 3 respectively.

In the modification example, light emitted from the first light source 4 and traveling through the light guide plate 3 passes through the second polarizer 7 after being diffused by the diffusion sheet 14. That is, the display device 51 according to this modification example widens the spread angle of the light passing through the second polarizers 7 and illuminating the transparent liquid crystal panel 2. Therefore, the display device 51 broadens the angle from which an image presented on the transparent liquid crystal panel 2 may be seen. Given that in this example, collimated light may also enter the diffusion sheet 14, the prisms formed on the diffusion surface 3b of the light guide plate 3 may be the triangular prisms 11 illustrated in FIG. 2B. Note that, no diffusion sheet 14 needs to be formed where no second polarizers 7 are provided. This ensures that light emitted from the second light source 5, reflected and scattered by the display body 10 and passing through the third polarizer 8 and the light guide plate 3 enters the transparent liquid crystal panel 2 with the polarization plane thereof unchanged.

In another modification example a prismatic sheet may be employed instead of a light guide plate to orient light from the first light source 4 toward the transparent liquid crystal panel 2.

Figure 8:
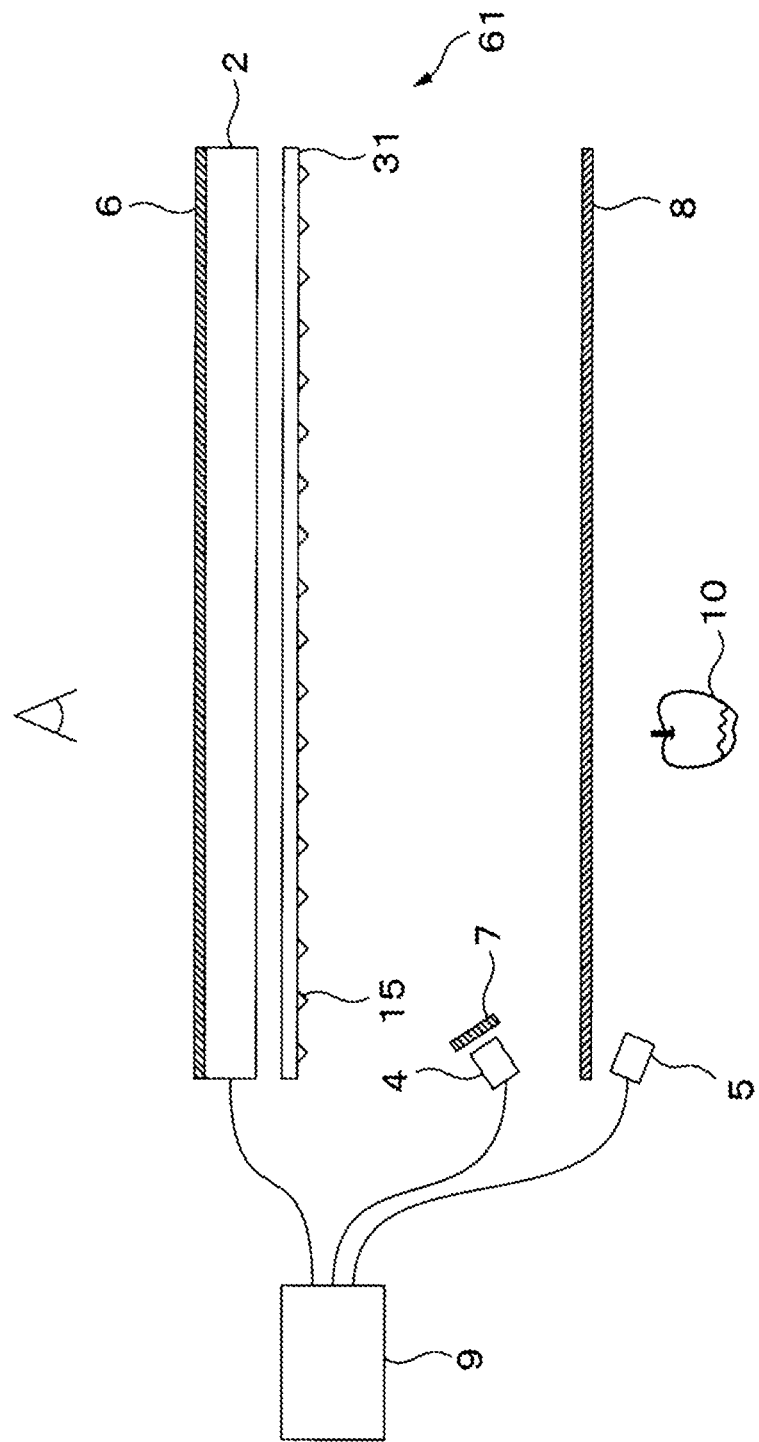
FIG. 8 is a cross-sectional view illustrating another example of modifying a display device.

FIG. 8 is a schematic side view illustrating an example of modifying a display device 61. In contrast to the display device 1 illustrated in FIG. 1, in this modification example a prismatic sheet 31 is placed between the transparent liquid crystal panel 2 and the third polarizer 8 instead of a light guide plate. Hereafter the prismatic sheet and related components are described.

The prismatic sheet is one example of a light guide element. The prismatic sheet 31 is a sheet-like component that is the same size as the display region of the transparent liquid crystal panel 2, and is produced from a resin that is transparent to visible light. A plurality of prisms 15 is formed on the rear surface of the prismatic sheet 31; the prisms direct light from the first light source 4 toward the transparent liquid crystal panel 2. As with the above mentioned one or more embodiments the distribution density in this case is the percentage area of the prismatic sheet 31 with regions whereon the prisms 15 are formed. The prisms 15 are preferably disposed so that the distribution density on the prismatic sheet 31 is no more than 30.0% or the haze of the prismatic sheet 31 is no more than 28%.

In the modification example, the second polarizer 7 transmits light from the first light source 4; the light enters the prismatic sheet 31 from the surface thereof facing the first light source 4 and with the prisms 15 thereon. The light is totally reflected between the surface with the prisms 15 facing the first light source 4 and the surface opposite thereto, and is then directed toward the transparent liquid crystal panel 2. In addition, light emitted from the second light source 5 and reflected and scattered by the display body 10 passes through the portions of the prismatic sheet 31 having no prisms 15 to reach the transparent liquid crystal panel 2. Therefore, a display device 61 modified according to this example can clearly and simultaneously show an image on the transparent liquid crystal panel 2 and a display body 10.

Figure 9:
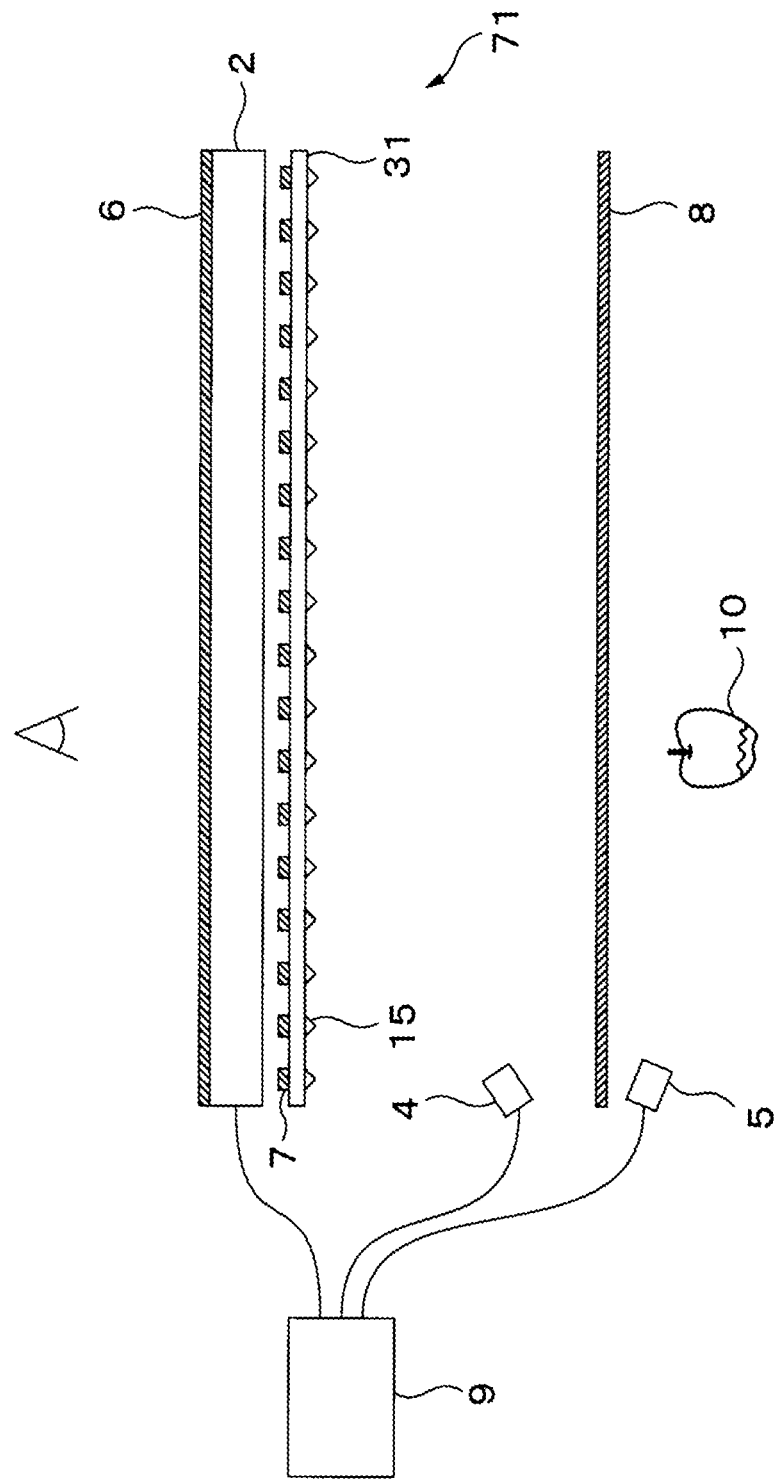
FIG. 9 is a schematic side view illustrating another example of modifying a display device.

FIG. 9 is a schematic side view illustrating another example of modifying a display device 71. In contrast to the display device 61 illustrated in FIG. 8, the second polarizer 7 is placed in the area between the prismatic sheet 31 and the rear surface of the transparent liquid crystal panel 2 in the display device 71 according to this modification example; more specifically the second polarizer 7 is provided discretely along the optical path of the light emitted from the first light source 4 that is reflected by the prisms 15. A second polarizer 7 and the third polarizer 8 are disposed so that the transmission axis for the second polarizer 7 and the transmission axis for the third polarizer 8 are mutually orthogonal. This modification still allows the controller 9 to thus adjust the voltage applied to the pixels included in the region of the transparent liquid crystal panel 2 that presents an image so that at least a portion of light from the first light source 4 passes through the first polarizer 6; and, on the other hand this modification allows the controller 9 to adjust the voltage applied to the pixels outside the aforementioned region so that the polarization plane of light emitted from the second light source 5 is roughly parallel to the transmission axis of the first polarizer 6. Therefore, a display device 71 modified according to this example can clearly and simultaneously show an image on the transparent liquid crystal panel 2 and a display body 10.

The third polarizer 8 may be excluded from the above mentioned one or more embodiments or modification example. If the third polarizer is omitted, at least a portion of the light emitted from the second light source 5 and reflected and scattered by the display body 10 passes through only the first polarizer 6; the transmittance of the first polarizer 6 is unchanged in relation to this light even when a voltage is applied to the transparent liquid crystal panel 2. Therefore, the observer can always see the display body 10 when the second light source 5 is turned on. Whereas, applying a voltage to the transparent liquid crystal panel 2 changes the transmittance of the first polarizer 6 in relation to light from the first light source 4 because this light passes through two polarizers surrounding the transparent liquid crystal panel 2 (i.e., the first polarizer 6 and the second polarizer 7). Thus, similarly to the above mentioned one or more embodiments and modification example, the controller 9 adjusts the voltage applied to the pixels in the region of the transparent liquid crystal panel 2 presenting an image so that at least a portion of the light emitted from the first light source 4 and transmitted through the second polarizer 7 is transmitted through the first polarizer 6. On the other hand, the controller 9 adjusts the voltage applied to the pixels in the region outside the region presenting an image so that the polarization plane of the light emitted from the first light source 4 and transmitted through the second polarizer 7 is orthogonal to the transmission axis of the first polarizer 6. Therefore, a display device can clearly and simultaneously show an image on the transparent liquid crystal panel 2 and a display body 10.

Moreover, it is sufficient that only light from the first light source 4 passes through the first polarizer 6 in modifications where the third polarizer 8 is omitted. Therefore, the first polarizer 6 may also be configured discretely instead of as covering the entire transparent liquid crystal panel 2.

Figure 10A:
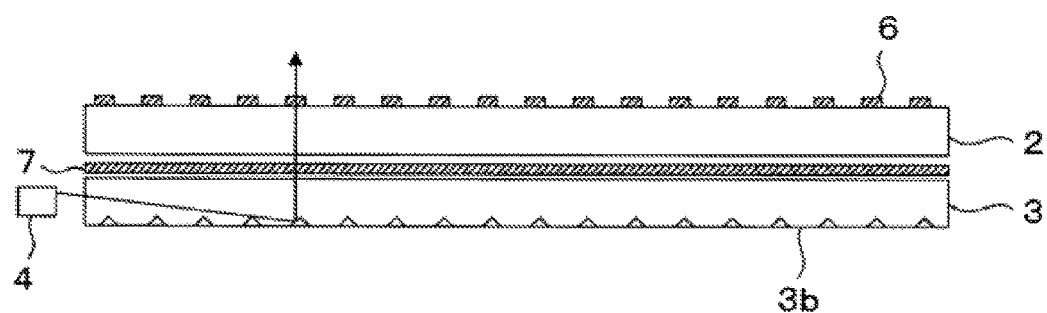
FIG. 10A through FIG. 10C are schematic side views illustrating display devices according to a modification examples where polarizers are discretely placed.
Figure 10B:
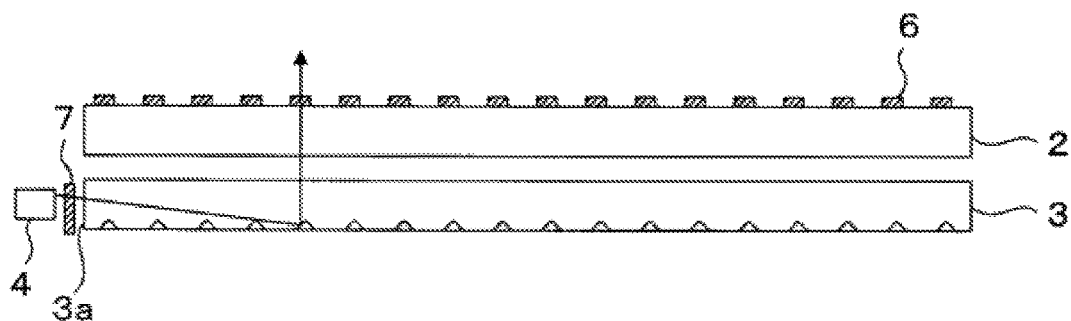
Figure 10C:
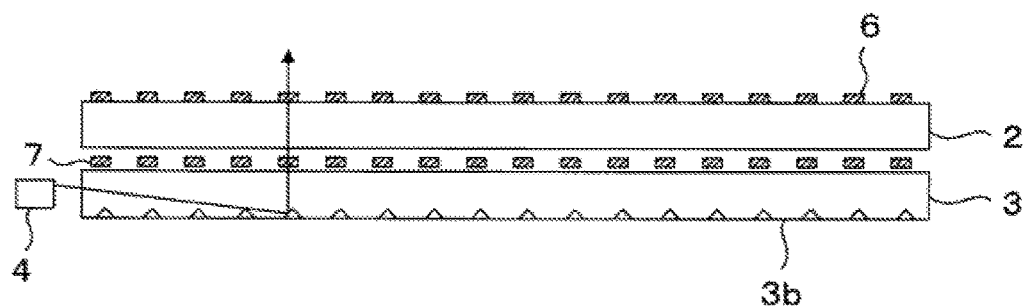

FIG. 10A through FIG. 10C are schematic side views of display devices according to a modification examples where first polarizers 6 are discretely placed. Note that FIG. 10A through 10C do not include the display body, controller, and second light source for simplicity.

In the example illustrated in FIG. 10A, the second polarizer 7 is placed between the emission surface 3c of the light guide plate 3 and the rear surface of the transparent liquid crystal panel 2 to cover the entire display region of the transparent liquid crystal panel 2. In contrast, the first polarizer 6 is formed discretely on only the regions where light emitted from the first light source 4 and reflected by the diffusion surface 3b of the light guide plate 3 pass.

In the example illustrated in FIG. 10B, in contrast to the example in FIG. 10A, the second polarizer 7 is provided between the first light source 4 and the incidence surface 3a of the light guide plate 3. Lastly, in the example illustrated in FIG. 10C, in contrast to the example illustrated in FIG. 10A, both the first polarizer 6 and the second polarizer 7 are formed discretely on only the regions where light emitted from the first light source 4 and reflected by the diffusion surface 3b in the light guide plate 3 pass.

As with a display device according to the above-mentioned one or more embodiments and modification examples, a display device according to any of the examples illustrated in FIG. 10A through FIG. 10C adjusts the voltage applied to the pixels included in a region on the transparent liquid crystal panel 2 presenting an image, and adjusts the voltage applied to the pixels outside the region to thereby allow a display body and an image on the transparent liquid crystal panel 2 to be presented clearly and simultaneously.

Moreover, the prismatic sheet 31 illustrated in FIG. 8 may be used in place of a light guide plate 3 in any of the modification examples illustrated in FIG. 10A through FIG. 10C.

Another modification that omits the third polarizer 8 may employ a front light type light guide plate in place of a backlight type light guide plate and prismatic sheet employed by the above-mentioned one or more embodiments and modification examples.

Figure 11A:
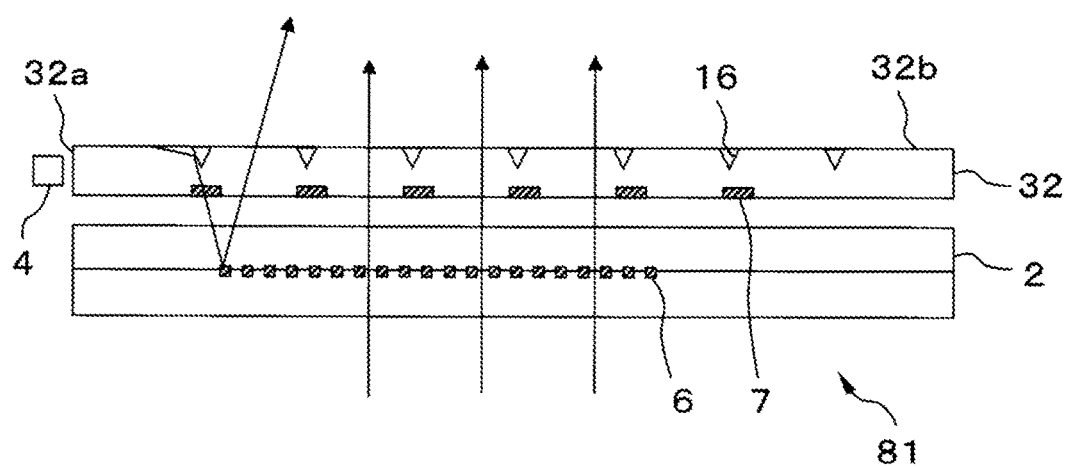
FIG. 11A and FIG. 11B are schematic side views illustrating display devices that use a front light type light guide plate.
Figure 11B:
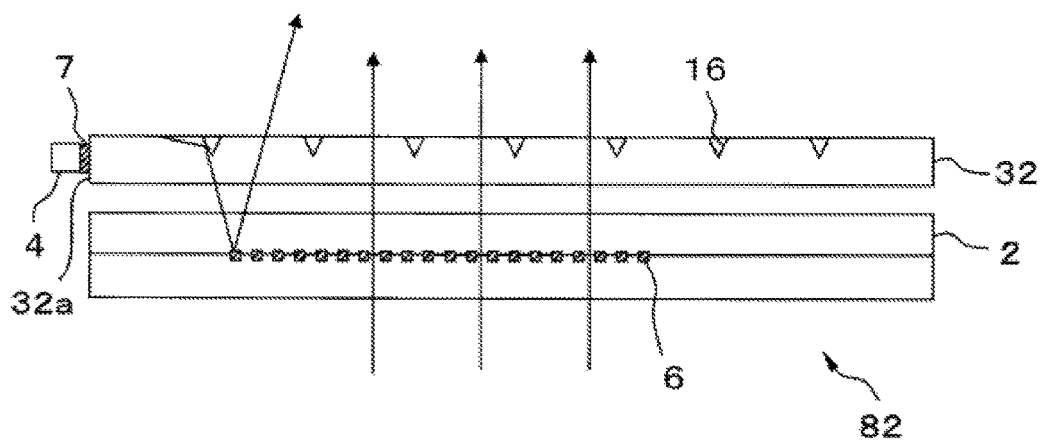

FIG. 11A and FIG. 11B are schematic side views of display devices that use a front light type light guide plate. Note that FIG. 11A and FIG. 11B do not include the display body 10, controller 9, and second light source 5 for simplicity.

In the display device 81 illustrated in FIG. 11 A, the front-light light guide plate 32 is arranged at the front surface of the transparent liquid crystal panel 2. The incident surface 32a is formed on the side surface of the light guide plate 32 to face the first light source 4. Light from the first light source 4 which enters the light guide plate 32 from the incidence surface 32a propagates through the light guide plate 32 and is reflected toward the transparent liquid crystal panel 2 by the diffusion surface 32b provided on the front surface of the light guide plate 32. Therefore, for example, similar to the prisms 11 illustrated in FIG. 2A and FIG. 2B, the diffusion surface 32b includes a plurality of prisms 16 placed in a grid or staggered thereon.

The rear surface of the light guide plate 32 also includes second polarizers 7 placed discretely in the regions wherethrough light from the first light source 4 that is reflected by any of the plurality of prisms 16 passes. The first polarizers 6 are also arranged discretely at locations on the rear surface of the transparent liquid crystal panel 2 where light from the first light source 4 arrives via the light guide plate 32 and the second polarizer 7. In this example, the first polarizer 6 may be a wire grid or multi-layered film that allows the first polarizer 6 to serve as a reflective polarizer.

In this modification example the controller 9 adjusts the voltage applied to the pixels in the region of the transparent liquid crystal panel 2 presenting an image so that at least a portion of the light emitted from the first light source 4 and transmitted through the second polarizer 7 is reflected at the first polarizer 6. On the other hand, the controller 9 adjusts the voltage applied to the pixels in the region outside the region presenting an image so that the polarization plane of the light emitted from the first light source 4 and transmitted through the second polarizer 7 is parallel to the transmission axis of the first polarizer 6. Hereby a portion of the light emitted from the first light source 4 travels through the second polarizer 7 and the transparent liquid crystal panel 2 and reflects from the first polarizer 6 in the region presenting an image. Therefore, an observer is able to see the light since that light passes through the transparent liquid crystal panel 2 and the light guide plate 32 and exits from the front surface of the light guide plate 32. Viewing the display body 10 is not affected since the first polarizer 6 reflects the light from the first light source 4 in the region outside the region presenting an image. In contrast, light emitted from the second light source 5 and reflected and scattered by the display body 10 placed behind the transparent liquid crystal panel 2 passes through the transparent liquid crystal panel 2 and the light guide plate 32 regardless of whether a voltage is applied to the transparent liquid crystal panel 2, and exits from the front surface of the light guide plate 32; thus an observer is able to see the display body. Therefore, a display device 81 can clearly and simultaneously show an image on the transparent liquid crystal panel 2 and a display body.

In contrast to the display device 81 illustrated in FIG. 11A, the second polarizer 7 is placed between the incidence surface 32a and the first light source 4 in the display device 82 illustrated in FIG. 11B. However, light from the first light source 4 still passes through the second polarizer 7 and the first polarizer 6 in the display device 82; therefore, similarly to the above mentioned examples adjusting the voltage applied to the transparent liquid crystal panel 2 allows the display device to clearly and simultaneously show the display body and an image on the transparent liquid crystal panel 2.

Moreover, as illustrated in FIG. 4 and FIG. 6, a display device causes the transparent liquid crystal panel 2 to transmit light emitted from the first light source 4 toward a plurality of mutually different directions. The aforementioned display device may also cause each pixel in the transparent liquid crystal panel 2 to present an image in accordance with the direction in which light emitted from the first light source 4 passes through the pixel, thus allowing the display device to present an image of the same object from different directions. For instance, in cases where the observer can be at an assumed location, the controller may apply a voltage to a group of pixels wherethrough light oriented in a first direction passes to rotate the polarization plane of the light oriented in the first direction and thereby present an image of the object from the first direction; the controller may also apply a voltage to a group of pixels wherethrough light oriented in a second direction passes to rotate the polarization plane of the light oriented in the second direction and thereby present an image of the object from the second direction. The display device is thus capable of superposing an image that appears three dimensional onto the display body.

One or more embodiments illustrated in FIG. 1 through FIG. 3B, or the modification examples illustrated in FIG. 10A and FIG. 10B may be modified similarly to the example illustrated in FIG. 6 where a plurality of light emitting elements in the first light source 4 are coupled to the prisms 11 so that light from the light emitting elements is incident on the prisms 11 whereby light from the light emitting elements spread while entering the light guide plate 3. Here the display device 1 may cause the transparent liquid crystal panel 2 to transmit light emitted from the first light source 4 toward a plurality of mutually different directions. Therefore, the controller may apply a voltage to rotate the polarization plane of light from a first direction for a group of pixels through which light passes through from the first direction to thereby present an image of the object as seen from that first direction; additionally, the controller may apply a voltage to rotate the polarization plane of light from a second direction to thereby present an image of the object as seen from the second direction. Hereby, the display device 1 is capable of superposing an image that appears three dimensional onto the display body 10.

The modification example illustrated in FIG. 7 may also be configured so that for each combination of a diffusion sheet 14 and a second polarizer 7, the light emitted from the first light source 4 and diffused by said combination of diffusion sheet and second polarizer travels through one group of pixels oriented in a first direction and travels through another group of pixels oriented in a second direction for the pixels in the transparent liquid crystal panel 2. In this case, the controller may still apply a voltage to rotate the polarization plane of light from a first direction for a group of pixels through which light passes through from the first direction to thereby present an image of the object as seen from that first direction; additionally the controller may apply a voltage to rotate the polarization plane of light from a second direction to thereby present an image of the object as seen from the second direction. Hereby, the display device 51 is capable of superposing an image that appears three dimensional onto the display body 10.

A display device according to any of the above one or more embodiments or modification examples may be mounted in a game machine such as pinball machine or a slot machine.

Figure 12:
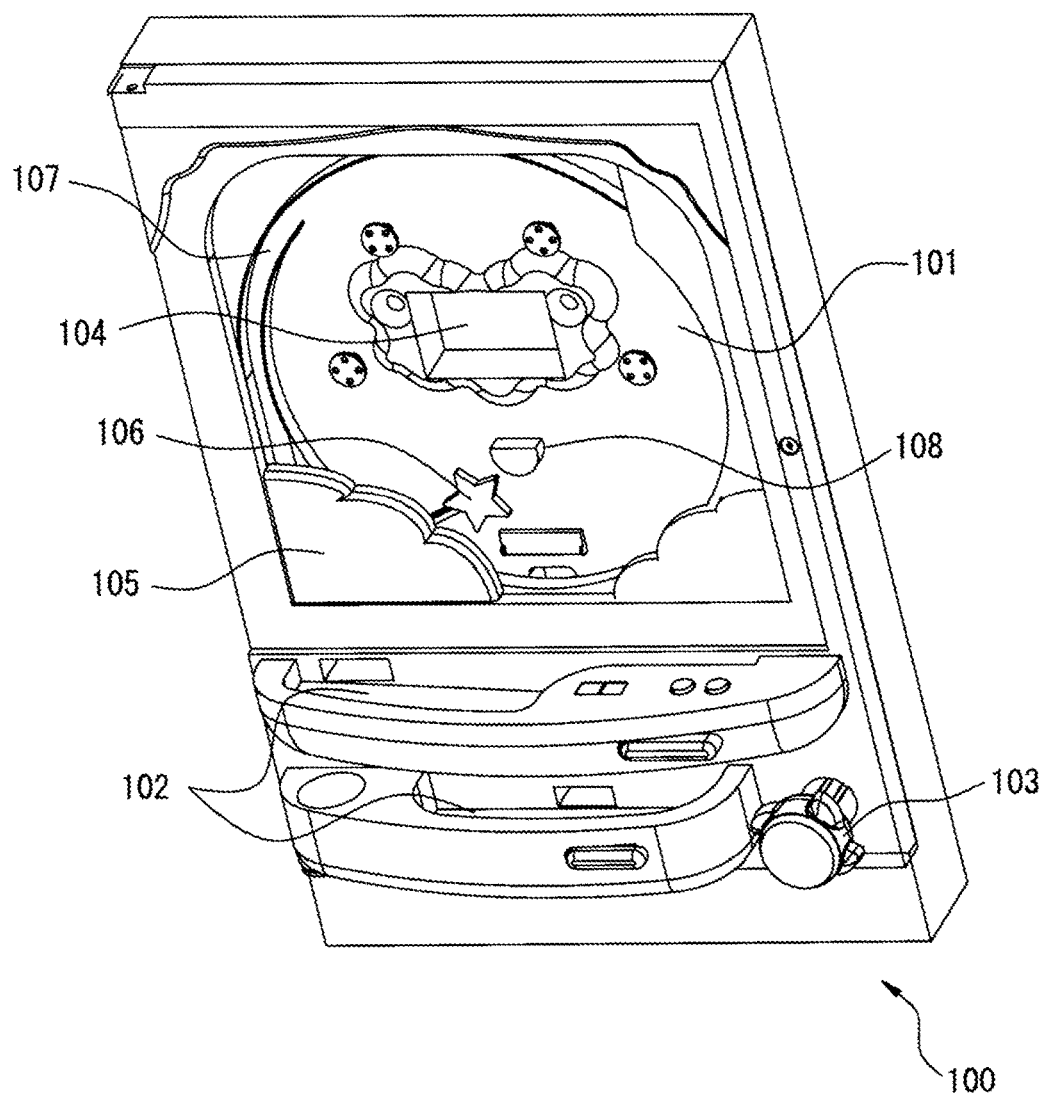
FIG. 12 is a diagram illustrating a schematic perspective view, i.e., a user view of pinball game machine including a display device according to one or more embodiments or modification examples.

FIG. 12 is a schematic perspective view, i.e., a user view of pinball game machine including a display device according to the above one or more embodiments or modification examples. The drawing is a schematic perspective view of a pinball machine 100. As illustrated in FIG. 12, a pinball machine 100 includes a playfield 101 which is the main game unit. The playfield 101 is where play takes place and takes up a majority of the machine, from the top portion to the center. The pinball machine 100 also includes a ball trough 102 arranged below the playfield 101, an input unit 103 provided with a jog; and a display device 104 provided at roughly the center of the playfield 101.

To aid in presenting the game, the pinball machine 100 includes a stationary gadget 105 arranged on the front surface of the playfield 101, at the lower part thereof and a moving gadget 106 arranged between the playfield 101 and the stationary gadget 105. The playfield 101 includes rails 107 positioned at the sides. The playfield 101 may also include multiple obstacle pins (not shown) and at least one prize target 108.

The input unit 103 launches the pinball at a predetermined force via a launcher (not shown) in accordance with the amount of rotation of the jog by a player. A launched pinball travels upward along the rails 107 and falls between the multiple obstacle pins. When a sensor (not shown) detects that a pinball has entered any of the prize targets 108, a main controller (not shown) provided on the rear side of the playfield 101 pays out a predetermined number of pinballs depending on the prize into the ball trough 102 via a payout device (not shown). The main controller also drives the display device 104 via a CPU (not shown) provided on the rear side of the playfield 101 for presenting effects.

The display device 104 is merely one example of a display device according to the above one or more embodiments and modification examples; this display device 104 may be attached to the playfield 101 so that the front surface of the transparent liquid crystal panel is oriented toward the player. The controller in the display device 104 may allow the player to see the display body arranged behind the display device 104, or allow the player to see the display body and an image on the transparent liquid crystal panel in accordance with a control signal from the presentation CPU that is responsive to the state of play.

A person having ordinary skill in the art may make various modifications in the above manner within the scope of the invention in accordance with how the device will be used.

The invention claimed is:

1. A display device comprising:
a transparent liquid crystal panel configured such that an object arranged at a rear surface of the transparent liquid crystal panel is visible from a front surface of the transparent liquid crystal panel, and configured to present an image;
a first polarizer arranged on one of: the front surface of the transparent liquid crystal panel; and the rear surface of the transparent liquid crystal panel;
a first light source;
a light guide element arranged at the other of: the front surface of the transparent liquid crystal panel; and the rear surface of the transparent liquid crystal panel, the light guide element formed from a transparent material and directing light from the first light source toward the transparent liquid crystal panel;
a second polarizer arranged between: the light guide element and the transparent liquid crystal panel; or the light guide element and the first light source, and arranged to not block at least a portion of light reflected from the object passing through the light guide element such that a polarization plane of the light from the first light source and a polarization plane of the light reflected from the object are mutually orthogonal; and
a controller configured to perform operations comprising controlling the transparent liquid crystal panel by applying a voltage to the transparent liquid crystal panel to rotate, on a per-pixel basis, a polarization plane of light passing through the transparent liquid crystal panel so that at least a portion of the light from the first light source entering the transparent liquid crystal panel via the second polarizer is transmitted through the first polarizer to present the image, and at least a portion of the light reflected from the object is transmitted through the first polarizer.

2. The display device according to claim 1, wherein:
the light guide element comprises a plurality of prisms arranged between the rear surface of the transparent liquid crystal panel and the object, and configured to reflect the light from the first light source toward the transparent liquid crystal panel; and
the second polarizer is arranged between the light guide element and the transparent liquid crystal panel so as to not block at least the portion of the light reflected from the object passing through the light guide element and is configured to transmit light emitted from the first light source and reflected by any of the plurality of prisms.

3. The display device according to claim 2, wherein each of the prisms comprises a reflection surface that is concave relative to the first light source.

4. The display device according to claim 2, wherein:
the first light source comprises a plurality of light emitting elements; and
the plurality of prisms reflects light emitted from the plurality of light emitting elements toward respective different locations on the second polarizer.

5. The display device according to claim 2, further comprising: a diffusion material arranged between the second polarizer and the light guide element so as to not block at least the portion of the light reflected from the object passing through the light guide element and configured to diffuse light emitted from the first light source and reflected by any of the plurality of prisms.

6. The display device according to claim 5, wherein:
a first group of pixels in the transparent liquid crystal panel transmits a first light, oriented in a first direction, that is emitted from the first light source and passed through the second polarizer and is diffused by the diffusion material after passing through the light guide element;
a second group of pixels in the transparent liquid crystal panel transmits a second light, oriented in a second direction, that is emitted from the first light source and passed through the second polarizer and is diffused by the diffusion material after passing through the light guide element; and
the controller applies a first voltage to the first group of pixels thereby rotating the polarization plane of the first light so that the transparent liquid crystal panel presents an image of a predetermined object from the first direction and applies a second voltage to the second group of pixels thereby rotating the polarization plane of the second light so that the transparent liquid crystal panel presents an image of the predetermined object from the second direction.

7. The display device according to claim 1, wherein:
the first light source comprises a plurality of light emitting elements, and the light guide element comprises a plurality of prisms configured to reflect light emitted from the first light source toward the transparent liquid crystal panel;
a first group of pixels in the transparent liquid crystal panel transmits a first light emitted from the plurality of light emitting elements and reflected by the plurality of prisms toward a first direction;
a second group of pixels in the transparent liquid crystal panel transmits a second light emitted from the light emitting elements and reflected by the plurality of prisms toward a second direction; and
the controller is further configured to perform operations comprising applying a first voltage to the first group of pixels thereby rotating the polarization plane of the first light so that the transparent liquid crystal panel presents an image of a predetermined object from the first direction and applies a second voltage to the second group of pixels thereby rotating the polarization plane of the second light so that the transparent liquid crystal panel presents an image of the predetermined object from the second direction.

8. The display device according to claim 1, wherein the second polarizer is placed between the light guide element and the first light source.

9. The display device according to claim 2, further comprising: a third polarizer situated between the object and the light guide element.

10. The display device according to claim 3, further comprising: a third polarizer situated between the object and the light guide element.

11. The display device according to claim 4, further comprising: a third polarizer situated between the object and the light guide element.

12. The display device according to claim 5, further comprising: a third polarizer situated between the object and the light guide element.

13. The display device according to claim 6, further comprising: a third polarizer situated between the object and the light guide element.

14. The display device according to claim 7, further comprising: a third polarizer situated between the object and the light guide element.

15. The display device according to claim 8, further comprising: a third polarizer situated between the object and the light guide element.

\* \* \* \* \*